(12) United States Patent
Baughman et al.

(10) Patent No.: US 11,475,211 B1
(45) Date of Patent: Oct. 18, 2022

(54) ELUCIDATED NATURAL LANGUAGE ARTIFACT RECOMBINATION WITH CONTEXTUAL AWARENESS

(71) Applicant: International Business Machines Corporation, Armonk, NY (US)

(72) Inventors: Aaron K. Baughman, Cary, NC (US); Nicholas Michael Wilkin, Issaquah, WA (US); Gray Franklin Cannon, Atlanta, GA (US); Christian Eggenberger, Wil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/372,702

(22) Filed: Jul. 12, 2021

(51) Int. Cl.
*G06F 17/00* (2019.01)
*G06F 40/166* (2020.01)
(Continued)

(52) U.S. Cl.
CPC ........ *G06F 40/166* (2020.01); *G06F 16/3344* (2019.01); *G06F 40/197* (2020.01);
(Continued)

(58) Field of Classification Search
CPC .. G06F 40/166; G06F 16/3344; G06F 40/197; G06N 20/00; G06Q 30/04; H04L 67/1097
(Continued)

(56) References Cited

U.S. PATENT DOCUMENTS 8,887,286 B2   11/2014  Dupont et al.
10,866,584 B2  12/2020  Cella et al.
(Continued)

FOREIGN PATENT DOCUMENTS

CA        3066775 A1     4/2019

OTHER PUBLICATIONS

Gururangan et al., Annotation Artifacts in Natural Language Inference Data, Proceedings of NAACL-HLT 2018, pp. 107-112, Jun. 1-6, 2018.
(Continued)

*Primary Examiner* — Jason T Edwards
(74) *Attorney, Agent, or Firm* — Garg Law Firm, PLLC; Rakesh Garg; Michael O'Keefe

(57) ABSTRACT

An embodiment includes identifying, from among the plurality of digital content datasets, a set of candidate textual items based on relevance to a specified subtopic using one or more natural language processing techniques. The embodiment groups candidate textual items into a predetermined number of groups using relevance scores and feature vectors. The embodiment trains a pre-trained encoder-decoder model using a designated group of selected textual items, where the pre-trained encoder-decoder model is pre-trained to generate textual content according to a particular style of writing. The embodiment generates, using the pre-trained encoder-decoder model, machine-authored textual content in the particular style of writing resulting in an article about the specified subtopic based on the designated group of selected textual items. The embodiment also includes transmitting the article to a remote web server as an update for a website.

25 Claims, 11 Drawing Sheets

(51) Int. Cl.
*G06F 40/197* (2020.01)
*G06Q 30/04* (2012.01)
*G06F 16/33* (2019.01)
*G06N 20/00* (2019.01)
*H04L 67/1097* (2022.01)

(52) U.S. Cl.
CPC ............. *G06N 20/00* (2019.01); *G06Q 30/04* (2013.01); *H04L 67/1097* (2013.01)

(58) Field of Classification Search
USPC ........................................................ 715/229
See application file for complete search history.

(56) References Cited

U.S. PATENT DOCUMENTS

| | | | |
|---|---|---|---|
| 2015/0058412 A1 | 2/2015 | Hillerbrand | |
| 2018/0267950 A1* | 9/2018 | de Mello Brandao | G06F 40/30 |
| 2018/0276184 A1* | 9/2018 | Krishna | G06F 40/40 |
| 2019/0354595 A1* | 11/2019 | Sabharwal | G06F 16/285 |
| 2020/0026772 A1* | 1/2020 | Wheeler | G06F 16/9535 |
| 2020/0387809 A1 | 12/2020 | Banerjee | |

OTHER PUBLICATIONS

Kitamoto et al., Context Recombination for Digital Cultural Archives, 2005.
ip.com, Contextually Aware Smart Box, Oct. 4, 2019.
ip.com, Method and System for Providing Image Tagging Classification using Natural Language Understanding (NLU) of Contextual Information, Apr. 1, 2019.
ip.com, Contextual Feature Generation Using Meta Learning for Automated Machine Learning, Dec. 7, 2020.
ip.com, Smart Command Line Contextualization Mechanism, Jan. 22, 2020.
Arkin et al., Contextual awareness: Understanding monologic natural language instructions for autonomous robots, 2017 26th IEEE International Symposium on Robot and Human Interactive Communication (RO-MAN), Aug. 28-Sep. 1, 2017.
Puls et al., Context-sensitive natural language generation for human readable event logs based on situation awareness in human-robot cooperation, The 11th International Conference on Ubiquitous Robots and Ambient Intelligence (URAI 2014), Nov. 12-15, 2014.
Garain, A Stochastic Approach for Finding Optimal Context in a Contextual Pattern Analysis Task, Feb. 18, 2016.
Orsi et al., Keyword-based, context-aware selection of natural language query patterns, EDBT 2011, Mar. 2011.
Biancalana et al., Context-aware movie recommendation based on signal processing and machine learning, CAMRa '11: Proceedings of the 2nd Challenge on Context-Aware Movie Recommendation, Oct. 2011, pp. 5-10.
Natural Language Processing Group, Tools for large-scale parser development, COLING '00: Proceedings of the COLING-2000 Workshop on Efficiency in Large-Scale Parsing Systems, Aug. 2000, pp. 54.

\* cited by examiner

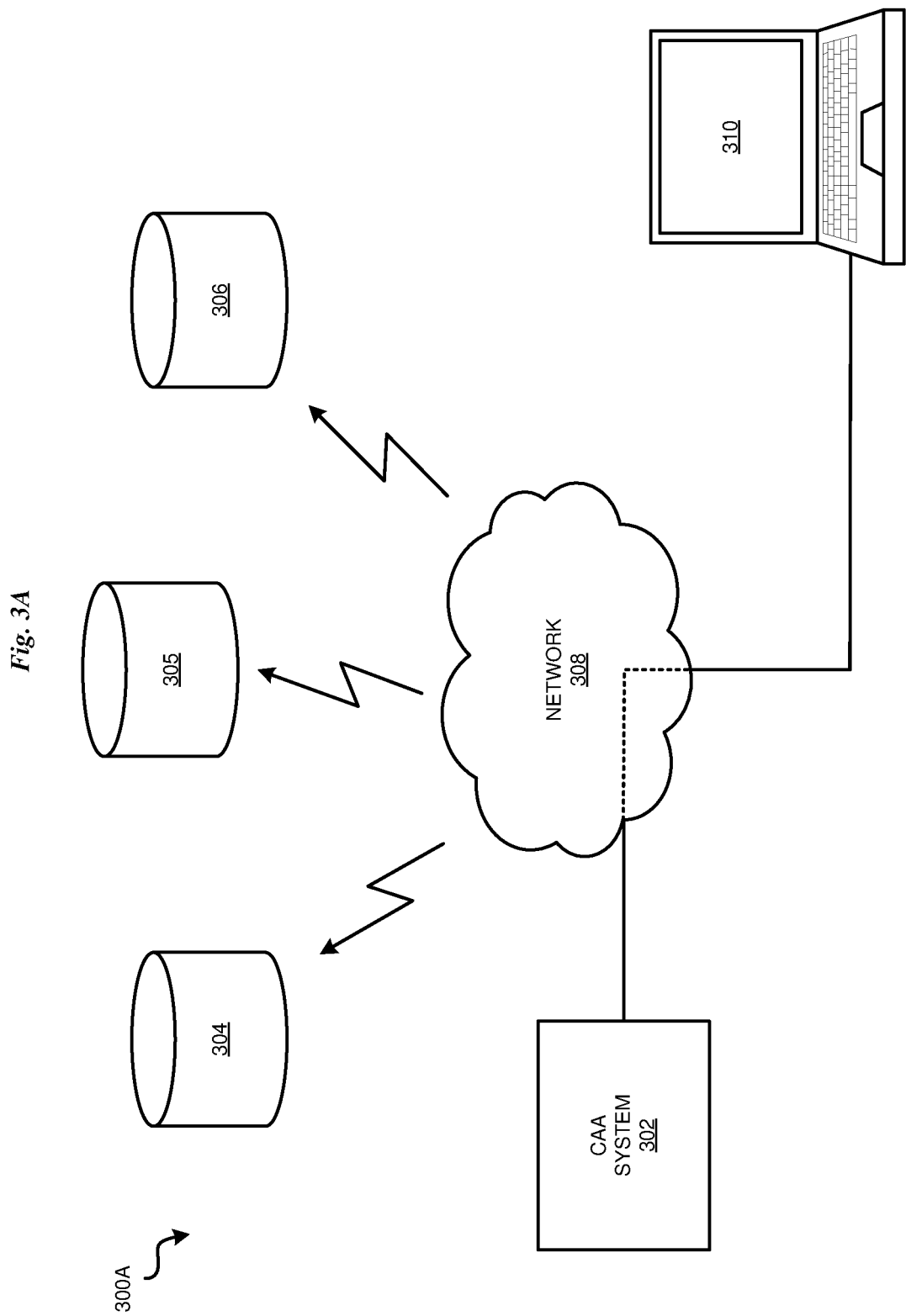

ELUCIDATED NATURAL LANGUAGE ARTIFACT RECOMBINATION WITH CONTEXTUAL AWARENESS

BACKGROUND

The present invention relates generally to the field of distribution of computer data over communication networks, and more particularly to elucidated natural language artifact recombination with contextual awareness.

Natural Language Processing (NLP) refers to an area of computer science and Artificial Intelligence (AI) as well as linguistics that involves some form of processing of a natural language input. Natural language input is typically in the form of unstructured data. Unstructured data refers to information that either does not have a pre-defined data model or is not organized in a pre-defined manner. Unstructured data is often mostly composed of some form of text, for example in written or audio form. At a high level, NLP typically involves converting unstructured data into structured data.

Examples of NLP include Natural Language Generation (NLG) and Natural Language Understanding (NLU). NLU is an area of NLP that primarily involves analyzing text and extracting metadata from unstructured content such as concepts, entities, keywords, categories, sentiment, emotion, relations, and semantic roles. NLU typically uses deep learning algorithms to analyze and extract such information from unstructured text. For example, NLU may be used to analyze customer feedback by performing a semantic analysis of customer comments and identifying whether the comments are positive or negative.

NLG is an area of NLP that primarily involves creating machine-authored content. For example, NLG may be used for extractive summarization. Extractive summarization involves analyzing a large document to identify key terms and phrases and then using this information to prepare a summary of the document.

These and other forms of NLP are available through respective platforms and services for performing tasks such as data mining or extractive summarization. These technologies may be used to establish NLP pipelines for analyzing bodies of information or corpora and will return results that vary depending on the technologies implemented in the respective NLP pipelines. This may be useful in situations where different forms of information are being sought. For example, an NLP pipeline may be established to search for statistical information for some general area of interest and another NLP pipeline may be established to search for editorial commentary in the same general area of interest where the two NLP pipelines involve different forms of NLP due to the different types of information being sought. However, because of the differences in the two NLP pipelines, the statistical information results and the editorial commentary results may touch on the same general area of interest but be specifically directed to different aspects of that general area of interest. As a result, it may be difficult or unfeasible to try to combine the outputs of multiple NLP pipelines into a single cohesive summary, article, or document.

SUMMARY

The illustrative embodiments provide for elucidated natural language artifact recombination with contextual awareness. An embodiment includes loading, as part of extracting content from a corpus, a plurality of digital content datasets into memory, where the plurality of digital content datasets satisfy a query statement, the query statement comprising a content topic to which the plurality of digital content datasets are related. The embodiment also includes identifying, from among the plurality of digital content datasets, a set of candidate textual items based on relevance of each candidate textual item to a subtopic using a computed relevance score for each candidate textual item, where the computed relevance scores are determined by analyzing, utilizing one or more natural language processing techniques, textual content of respective candidate textual items, where the analyzing of the textual content of the candidate textual items results in respective feature vectors for each of the candidate textual items, and where the feature vectors each include a respective relevance value and a respective quality value. The embodiment also includes grouping, as a result of executing a set of instructions in a processor, using the computed relevance scores and feature vectors, candidate textual items from the set of candidate textual items into a predetermined number of groups of candidate textual items. The embodiment also includes training a first pre-trained encoder-decoder model using, from among the groups of candidate textual items, a first designated group of candidate textual items, where the first pre-trained encoder-decoder model is pretrained to generate textual content according to a first style of writing. The embodiment also includes generating, utilizing the first pre-trained encoder-decoder model, machine-authored textual content in the first style of writing resulting in a first article about the specified subtopic based on the first designated group of candidate textual items. The embodiment also includes training a second pre-trained encoder-decoder model using, from among the groups of candidate textual items, a second designated group of candidate textual items, where the second pre-trained encoder-decoder model is pretrained to generate textual content according to a second style of writing. The embodiment also includes generating, utilizing the second pre-trained encoder-decoder model, machine-authored textual content in the second style of writing resulting in a second article about the specified subtopic based on the second designated group of candidate textual items. The embodiment also includes transmitting the first and second articles to a remote web server as updates for a website hosted by the remote web server. Other embodiments of this aspect include corresponding computer systems, apparatus, and computer programs recorded on one or more computer storage devices, each configured to perform the actions of the embodiment.

Some such embodiments further comprise loading, into memory, user-generated content generated by the user and identifying, from the user-generated content, selected user-generated content based on relevance of the selected user-generated content to the topic. The loading of relevant user-generated content advantageously allows for embodiments that further comprise analyzing, as a part of determining a sentiment of the user towards the topic, the selected user-generated content resulting in determining a polarity of the selected user-generated content. The determining of the sentiment of the user towards a topic advantageously allows for embodiment that further comprise generating a weight vector based on the sentiment of the user towards the topic, where the grouping of the candidate textual items into groups of candidate textual items further comprises using the weight vector to adjust values of the feature vectors. The adjusting of the feature vectors using such a weight vector advantageously allows for the first and second articles to be tailored to the user such that the transmitting the first and second articles may be used as updates for a custom webpage, where the custom webpage is customized for the user.

According to another aspect of the present disclosure, an embodiment includes executing a querying process that searches a plurality of corpora for content related to a specified topic. The embodiment also includes extracting, from among search results received from the querying process, a set of candidate textual items based on relevance of each candidate textual item to a specified subtopic using a computed relevance score for each candidate textual item, where the computed relevance scores are determined by analyzing, utilizing one or more natural language processing techniques, textual content of respective candidate textual items. The embodiment also includes where the analyzing of the textual content of the candidate textual items results in respective feature vectors for each of the candidate textual items. The embodiment also includes where the feature vectors each include a respective relevance value and a respective quality value. The embodiment also includes loading into memory user-generated content generated by the user. The embodiment also includes analyzing, as a part of determining a sentiment of the user towards the specified subtopic, the user-generated content resulting in determining a polarity of the user-generated content. The embodiment also includes generating a weight vector based on the sentiment of the user towards the specified subtopic. The embodiment also includes grouping, as a result of executing a set of instructions in a processor, using the computed relevance scores, weight vector, and feature vectors, candidate textual items from the set of candidate textual items into a predetermined number of groups of candidate textual items. The embodiment also includes training a pre-trained encoder-decoder model using, from among the groups of candidate textual items, a designated group of candidate textual items. The embodiment also includes generating, utilizing the pre-trained encoder-decoder model, machine-authored textual content resulting in an article about the specified subtopic based on the designated group of candidate textual items. The embodiment also includes transmitting the article to a remote web server as an update for a display of content that is personalized for the user based on the sentiment of the user. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 3A depicts a block diagram of an example configuration in accordance with an illustrative embodiment;

DETAILED DESCRIPTION

Figure 1:
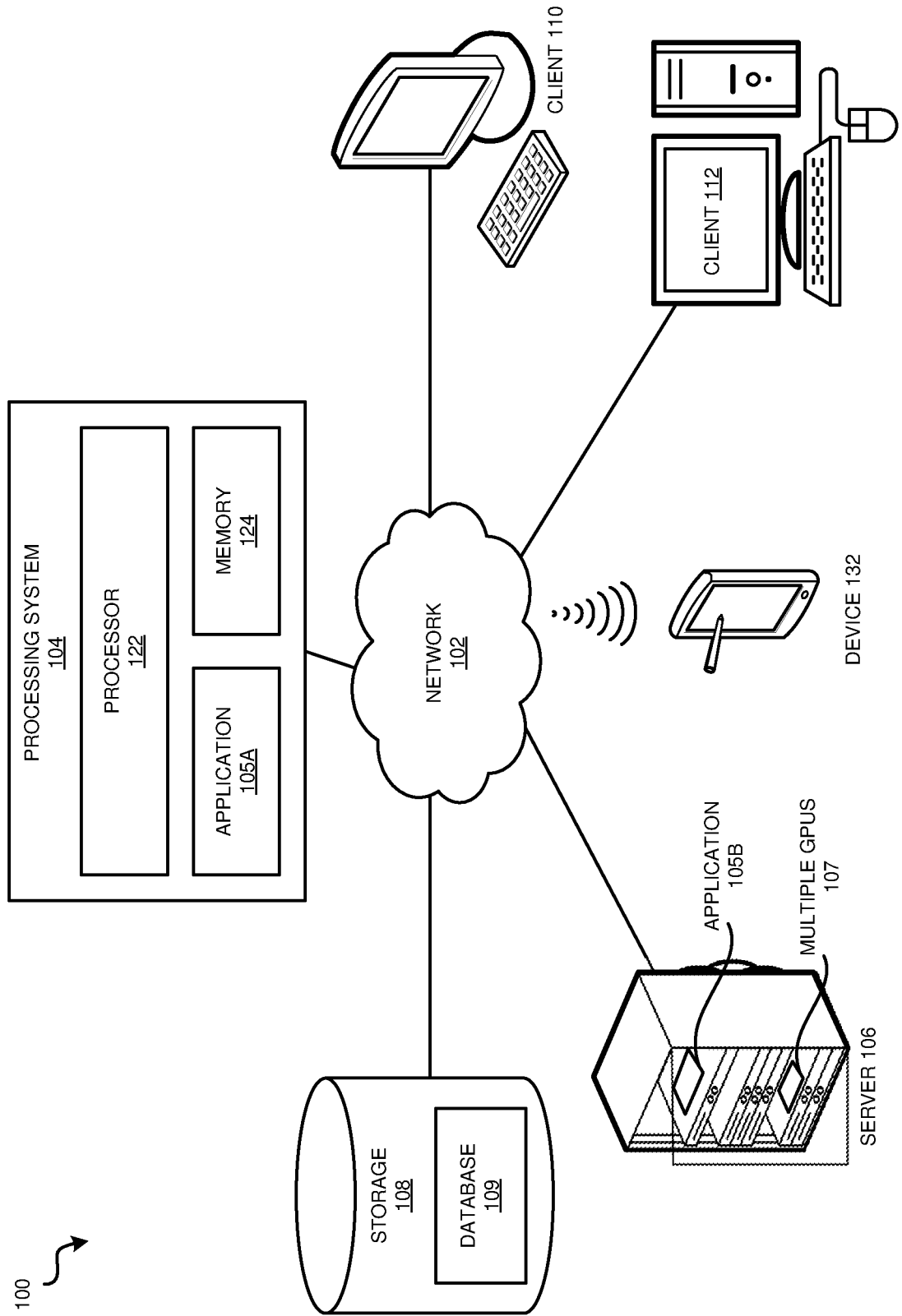
FIG. 1 depicts a block diagram of a data processing system in which illustrative embodiments may be implemented.

The volume of information available for consumption continues to grow at an unprecedented pace. For example, recent years have seen a dramatic growth of natural language text data, including web pages, news articles, scientific literature, emails, enterprise documents, and social media (such as blog articles, forum posts, product reviews, and tweets). This information is being consumed by a continuously growing audience of global users gaining access to the Internet. Recent statistics indicate that more than 4 billion people now have some form of access to the Internet, which represents more than half of the world's population.

Massive numbers of users having access to massive amounts of information are generating an increasing demand for powerful software tools to help people manage and analyze vast amounts of information effectively and efficiently. Applications that address this demand include such things as personalized news aggregators that gathers syndicated web content such as online newspapers, blogs, podcasts, and video blogs (vlogs) in one location for easy viewing. It has been recognized that such applications may be improved by using NLP technology to generate summaries of each the aggregated articles and providing these summaries to the user enabling him to more quickly receive an overview of the aggregated content.

NLP technology has proven useful for many such applications that help users gain insights from vast amounts of available information. Many diverse types of NLP techniques and algorithms are known for producing textual content for consumption by users. The delivery, content, and style of the textual content varies depending on the NLP techniques used to gather and produce it. Typically, multiple NLP techniques are combined to form an NLP pipeline for performing a combination of NLP processes. The use of multiple distinct NLP pipelines for gathering and processing information may be desirable in order to achieve variety in the style and content of information being accumulated. However, this variety becomes problematic when trying to assemble a cohesive composition, such as an article, document, or webpage, using content provided by the different NLP pipelines.

As an example, an application or webpage devoted to a major event, such as a sporting event, expo, or convention, may gather content using multiple distinct NLP pipelines that use different types of NLP techniques. One NLP pipeline provides factoids by searching vast amounts of information for topic-related articles, using extractive summarization to summarize the articles, ranking the summaries based on relevance to the topic, quality of information, and other factors, and outputting some number of the highest-ranking summaries. A "factoid," as used herein, refers to a summary of a news article about a topic, or a little-known (i.e., trivial), but interesting, piece of information about a topic. Another NLP pipeline provides statistical sentences, also referred to herein as "insights," by querying statistical databases for topic-related statistics provided as structured data, using Natural Language Generation to write new sentences based on the topic-related statistics, ranking the statistical sentences based on relevance to the topic, quality of information, and other factors, and outputting some number of the highest-ranking statistical sentences.

While the resulting summaries and statistical sentences may be related to a particular topic, such as a particular sport, music genre, or area of technology, they may nevertheless be directed to different aspects of the topic. For example, where the topic is a particular sport, the summaries may be directed to the family lives of players, new stadiums, and training techniques, whereas the statistical sentences are directed to player performance under certain weather conditions, team records, and league records. Presented separately, this is all relevant information for the given topic that a user may find beneficial and interesting. However, a technical problem exists because these results include information about aspects of the topic that are too unrelated to be coherently combined into a single cohesive article about the topic.

AI techniques now also include NLP technologies, such as Natural Language Generation, that produce machine-authored content, such as machine-authored stories, content summaries, and novel text. These techniques generate text that is closely related to the input data, which limits these techniques to using input data from a single NLP pipeline for generating new textual content. As such, these techniques lack the ability to overcome the technical problem described above when trying to generate cohesive content from diverse NLP pipelines.

Other technical problems include that these technologies also lack the ability to personalize generated text for each user. User preferences may be ascertained, for example based on user inputs or activities, in order to determine such things as the user's sentiment towards certain topics and/or aspects of writing style preferred by the user. However, existing text generation technologies lack the ability to generate text content personalized for a user that has characteristics, such as writing style or topic sentiment, that match the user's preferences.

The illustrative embodiments address these technical problems by providing for combining inputs provided from a plurality of NLP pipelines, and using the combined inputs as a basis for generating new machine-authored textual content. Disclosed embodiments create an NLP pipeline that combines the inputs provided from a plurality of NLP pipelines using a Multiple Knapsack Problem (MKP) algorithm. Disclosed embodiments detect user preferences and apply masking techniques to adapt the text generation process to generate text having one or more characteristics selected based on the user preferences.

The problem of generating machine-authored textual content from multiple distinct NLP pipelines may be addressed by identifying content items from the multiple distinct NLP pipelines that are related. As non-limiting examples provided to aid in the understanding of the present disclosure, an embodiment includes a first NLP pipeline that provides input data for factoids, and a second NLP pipeline that provides input data for insights. In some embodiments, the first and second NLP pipelines query one or more corpora for digital content datasets that satisfy a query statement. In some such embodiments the query statement includes a reference to the particular topic of interest (e.g., basketball from the above example).

In some such embodiments, the first and second NLP pipelines provide inputs by extracting digital content datasets (e.g., factoids by the first NLP pipeline and insights by the second NLP pipeline) that satisfy the query and load them into memory. The digital content items may be textual items, and may include phrases, sentences, or other blocks of text. In some such embodiments, the inputs are used to create content for an application that runs on a user device that displays content related to a particular topic. The displayed content, referred to in this example as current related content, is periodically updated so that older created content is occasionally replaced by newer created content.

The problem of identifying content items from the multiple distinct NLP pipelines that are related may be restated as the optimization of the joint probability of having factoids, insights, and current related content together within the same application display. As an optimization problem, this problem may be modeled as expression (1) below.

$$P|(R_c|\text{Factoids, Insights}) = \frac{P(R_c, \text{Factoids, Insights})}{P(\text{Factoids, Insights})} \quad (1)$$

By a series of substitutions, expression (1) may be written as expression (2), then (3), and then (4).

$$\frac{P(R_c, \text{Factoids, Insights})}{P(\text{Factoids, Insights})} = \frac{P(\text{Factoids}|R_c)P(R_c|\text{Insights})}{P(\text{Factoids}|\text{Insights})} \quad (2)$$

$$P(R_c|\text{Insights}) = \frac{P(\text{Insights}|R_c)P(R_c)}{P(\text{Insights})} \quad (3)$$

$$\frac{P(\text{Factoids}|R_c)P(\text{Insights}|R_c)P(R_c)}{P(\text{Factoids}|\text{Insights})P(\text{Insights})} \quad (4)$$

In expressions (1)-(4), $P(R_c)$=the probability of having relevant content is dependent on if the input data can be retrieved that is relevant to the current topic. For example, if the current topic is about an event the user is attending, for example a basketball tournament, this is the probability of the NLP pipelines providing inputs related to basketball or the basketball tournament. $P(\text{Factoids}|\text{Insights})$=the probability of obtaining factoids related to insights. A decision optimization algorithm is used to create groups of packages of factoids and insights that are highly related and correlated. $P(\text{Insights})$=the probability of generating good quality and diverse insights from source data that is highly precise structured information about the topic (i.e., basketball in this example). Embodiments use Natural Language Generation, transformer models and a decision optimization algorithm to improve the likelihood of generating good quality and diverse insights.

Further focusing on the optimization problem modelled by expressions (1)-(4), the model may be optimized by maximizing expression (4), which may be maximized by maximizing the two terms shown as expressions (5) and (6) below.

$$P(Factoids|R_c) \quad (5)$$

$$P(Insights|R_c) \quad (6)$$

The NLP roadmap can thus be focused on optimizing the retrieval of factoids and insights given the content a user is currently viewing. Disclosed embodiments seek to address this optimization using novel multi-head attention transformers to focus on the most relevant pieces of information based on customization or page edits.

In some illustrative embodiments, the optimization problem is modeled as an MKP. There are many known algorithms for solving the MKP, any of which may be used as the decision optimization algorithm used to create groups of packages. The MKP algorithm seeks to group digital content datasets (e.g., factoid sentences received from the first NLP pipeline and insight sentences received from the second NLP pipeline).

In some such embodiments, before the content from the NLP pipelines is processed by the MKP algorithm, certain candidate items are selected from the datasets to reduce the amount of processing required by the MKP algorithm. In some such embodiments one or more sets (corresponding to respective subtopics) of candidate textual items are identified from among the plurality of digital content datasets. In some such embodiments, the candidate textual items in each set are identified based on relevance to the subtopics associated with the sets of candidate items.

Following the example discussed above in which the topic is basketball, three examples of subtopics provided for illustrative purposes only may include team matchups, player biographies, and injury reports. In some embodiments, the candidate items are analyzed for relevance to each of the subtopics. In some such embodiments the candidate items may also be evaluated for other factors, such as quality (e.g., amount of grammatical or spelling errors, presence of offensive content, etc.), sentiment (e.g., strength of opinion(s) expressed, side of argument taken, etc.), length, or other metrics. In some such embodiments this analysis results in computed relevance scores for each candidate textual item, wherein the computed relevance scores are determined by analyzing, utilizing one or more natural language processing techniques, textual content of respective candidate textual items. This information is used to generate feature vectors for each of the factoid and insight candidate items, where the "features" are preselected subtopics, and the feature values are indicative of how similar the factoid or insight is to respective subtopics. In some embodiments, the feature vectors may include more or fewer features than the present example. Thus, the feature vectors include numerical values representative of how relevant the associated factoid or insight is to each of the subtopics as well as quality scores and values for other desired factors.

In illustrative embodiments, the MKP algorithm receives the candidate items and feature vectors for each of the candidate factoids and each of the insights. The MLP algorithm groups, as a result of executing a set of instructions in a processor, using the computed relevance scores and feature vectors, candidate textual items from the set of candidate textual items into a predetermined number of groups of candidate textual items.

Some illustrative embodiments include the use of extractive summarization with cross entropy quality measures to pick a subset of sentences from one of the groups of packages. In some embodiments, the subset of sentences may be selected using a cross-entropy summarization (CES)-like method for selecting the most 'promising' subset of sentences. By way of background, the cross entropy (CE) method provides a generic Monte-Carlo optimization framework for solving hard combinatorial problems. To this end, CE gets as an input, e.g., $\hat{Q}(\bullet|q,D)$, and a constraint on maximum summary length L. Let $$CEM(\hat{Q}(\bullet|q,D),L)$$

denote a single invocation of the CE method. The result of such an invocation is a single length-feasible summary S* which contains a subset of sentences selected from D which maximizes $\hat{Q}(\bullet|q,D)$. For example, CES is implemented by invoking $$CEM(\hat{Q}_{CES}(\bullet|q,D),L_{max}).$$

For a given sentence s∈D, let φ(s) denote the likelihood that it should be included in summary S. Starting with a selection policy with the highest entropy (i.e., $\varphi_0(s)=0.5$), the CE method learns a selection policy φ*(•) that maximizes $\hat{Q}(\bullet|q,D)$.

To this end, φ*( ) is incrementally learned using an importance sampling approach. At each iteration t=1, 2, . . ., a sample of N sentence-subsets $S_j$ is generated according to the selection policy $\varphi_{t-1}(\bullet)$ which was learned in the previous iteration t−1. The likelihood of picking a sentence s∈D at iteration t is estimated (via cross-entropy minimization) according to expression (7) below.

$$\varphi_t(s) \stackrel{def}{=} \frac{\sum_{j=1}^{N} \delta_{[\hat{Q}(S_j|q,D) \geq \gamma_t]} \delta_{[s \in S_j]}}{\sum_{j=1}^{N} \delta_{[\hat{Q}(S_j|q,D) \geq \gamma_t]}} \quad (7)$$

Here, $\delta_{[\bullet]}$ denotes the Kronecker-delta (indicator) function, and $\gamma_t$ denotes the (1−ρ)-quantile (p∈(0, 1)) of the sample performances $\hat{Q}(S_j|q,D)$ (j=1, 2, . . . , N). Therefore, the likelihood of picking a sentence s∈D will increase when it is being included in more (subset) samples whose performance is above the current minimum required quality target value $\gamma_t$. In some embodiments, $\varphi_t(\bullet)$ may further be smoothed as follows:

$$\Phi t(\bullet)'=\alpha\varphi_{t-1}(\bullet)+(1-\alpha)\varphi_t(\bullet),$$

with α∈[0, 1].

Upon its termination, the CE method is expected to converge to the global optimal selection policy φ*(•). A single summary $S^*\_\varphi^*(\bullet)$ may then be produced based on the convergence. To enforce that only feasible summaries will be produced, $\hat{Q}(S_j|q,D)=-\infty$ may be set whenever a sampled summary $S_j$ length exceeds the L word limit. Alternatively, the maximum length constraint may be directly enforced during sampling.

In some embodiments, because an unsupervised setting is assumed, no actual reference summaries are available for training. Similarly, actual quality target Q(S|q, D) cannot be directly optimized. Instead, Q(S|q, D) may be 'surrogated' by several summary quality prediction measures:

$$\hat{Q}(S_j|q,D)(i=1,2,\ldots,m).$$

Each such quality 'predictor' $\hat{Q}(S|q,D)$ is designed to estimate the level of saliency or focus of a given candidate summary S, and is presumed to correlate (up to some extent) with actual summarization quality. For simplicity, the several quality predictors are assumed to be independent of one another, and are combined into a single optimization objective by taking their product:

$$\hat{Q}(S|q,D) \approx \Pi_{i-1}{}^m \hat{Q}(S|q,D).$$

In some embodiments, the present summarizer may employ several different predictors, e.g., five different predictors. As a non-limiting example, in some embodiments, the first two predictors use unigram language models built from the factoid corpora and the statistical corpora, respectively. They employ known techniques to measure how much information in the sentence covers the query and how much mass devotes to the query. A third predictor determines how much of the summary covers the package set. The fourth predictor measures entropy to achieve variety in the sentences. The last two provide for bias sentences that are longer in length and are descriptive with predicate argument structures. In some embodiments, the present summarizer may employ more or fewer predictors.

The optimization equation shown as expression (7) above thus provides a model for finding the best combination of sentences that follow the original constraints (expressions (5) and (6) above). This combination of sentences is then input into an algorithm that generates machine-authored textual content, such as a T5 transformer, by rewriting the sentences into cohesive units of text.

In some embodiments, content is personalized for the end user. In some such embodiments, a process for personalizing the content loads user-generated content into memory. For example, in some embodiments, the process sends a feedback request to the user that includes a request for feedback regarding an opinion expressed in an editorial article related to the subtopic. The user may be invited to comment on the opinion or simply indicate whether they agree or disagree with the opinion. The user-generated content would thus include the feedback received from the user in response to the feedback request. In some embodiments, the user-generated content may include one or more comments that the user posted in response to a post or article related to the subtopic, for example on a news website or social media website. In such embodiments, the user would have previously provided a list of such websites in which they actively participate and would have indicated that they agree to opt-in to allowing the process to access these comments previously posted by the user.

In some embodiments, the process analyzes the user-generated content in order to determine a polarity of the user-generated content, which the process uses to determine the user's sentiment towards the specified subtopic. In some such embodiments, the process generates a weight vector based on the sentiment of the user towards specified subtopics. This weight vector is input to the MKP algorithm with the candidate items and feature vectors for each of the candidate factoids and insights. The weight vectors have a value for each value in the feature vector that act as a mask to emphasize or de-emphasize certain features of the feature vector. For example, if the user is interested in first and third subtopics but not the second subtopic, the weight values may be set to a first value (e.g., 1 or 100) for the subtopics of interest to the user, and other weight values may be set to a second value (e.g., zero) for the subtopics not of interest to the user. As a result, the MKP algorithm groups the candidate textual items into a predetermined number of groups based on the computed relevance scores, the weight vector, and the feature vectors.

Also, in some such embodiments, the process trains a pre-trained encoder-decoder model using a designated group of candidate textual items from among the groups of candidate textual items. The process then generates machine-authored textual content utilizing the pre-trained encoder-decoder model, resulting in an article about the specified subtopic based on the designated group of candidate textual items.

The illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and Personal Digital Assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
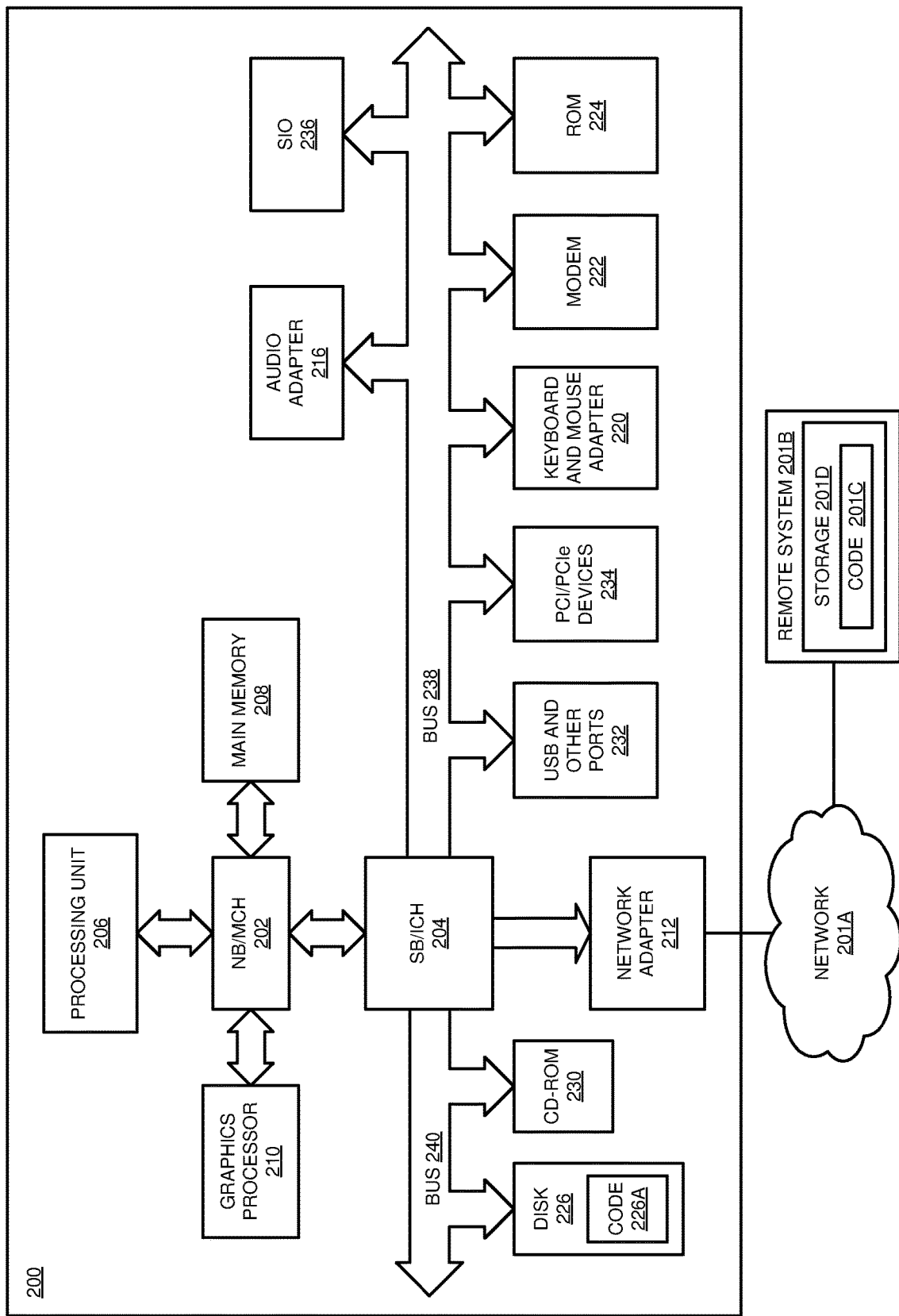
FIG. 2 depicts a block diagram of an example configuration in accordance with an illustrative embodiment.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Applications 105A/105B implement an embodiment described herein. Applications 105A/B executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a Local Area Network (LAN), or a Wide Area Network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and Memory Controller Hub (NB/MCH) 202 and South Bridge and Input/output (I/O) Controller Hub (SB/ICH) 204. Processing unit 206, main memory 208, and graphics processor 210 are coupled to NB/MCH 202. Processing unit 206 may contain one or more processors and may be implemented using one or more heterogeneous processor systems. Processing unit 206 may be a multi-core processor. Graphics processor 210 may be coupled to NB/MCH 202 through an Accelerated Graphics Port (AGP) in certain implementations.

In the depicted example, LAN adapter 212 is coupled to SB/ICH 204. Audio adapter 216, keyboard and mouse adapter 220, modem 222, Read Only Memory (ROM) 224, Universal Serial Bus (USB) and other ports 232, and PCI/PCIe devices 234 are coupled to SB/ICH 204 through bus 238. Hard Disk Drive (HDD) or Solid-State Drive (SSD) 226 and Compact Disc Read-Only Memory (CD-ROM) 230 are coupled to SB/ICH 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash Binary Input/Output System (BIOS). HDD 226 and CD-ROM 230 may use, for example, an Integrated Drive Electronics (IDE), Serial Advanced Technology Attachment (SATA) interface, or variants such as external-SATA (eSATA) and micro-SATA (mSATA). A Super I/O (SIO) device 236 may be coupled to SB/ICH 204 through bus 238.

Memories, such as main memory 208, ROM 224, or flash memory (not shown), are some examples of computer usable storage devices. HDD or SSD 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a PDA, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in NB/MCH 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3B:
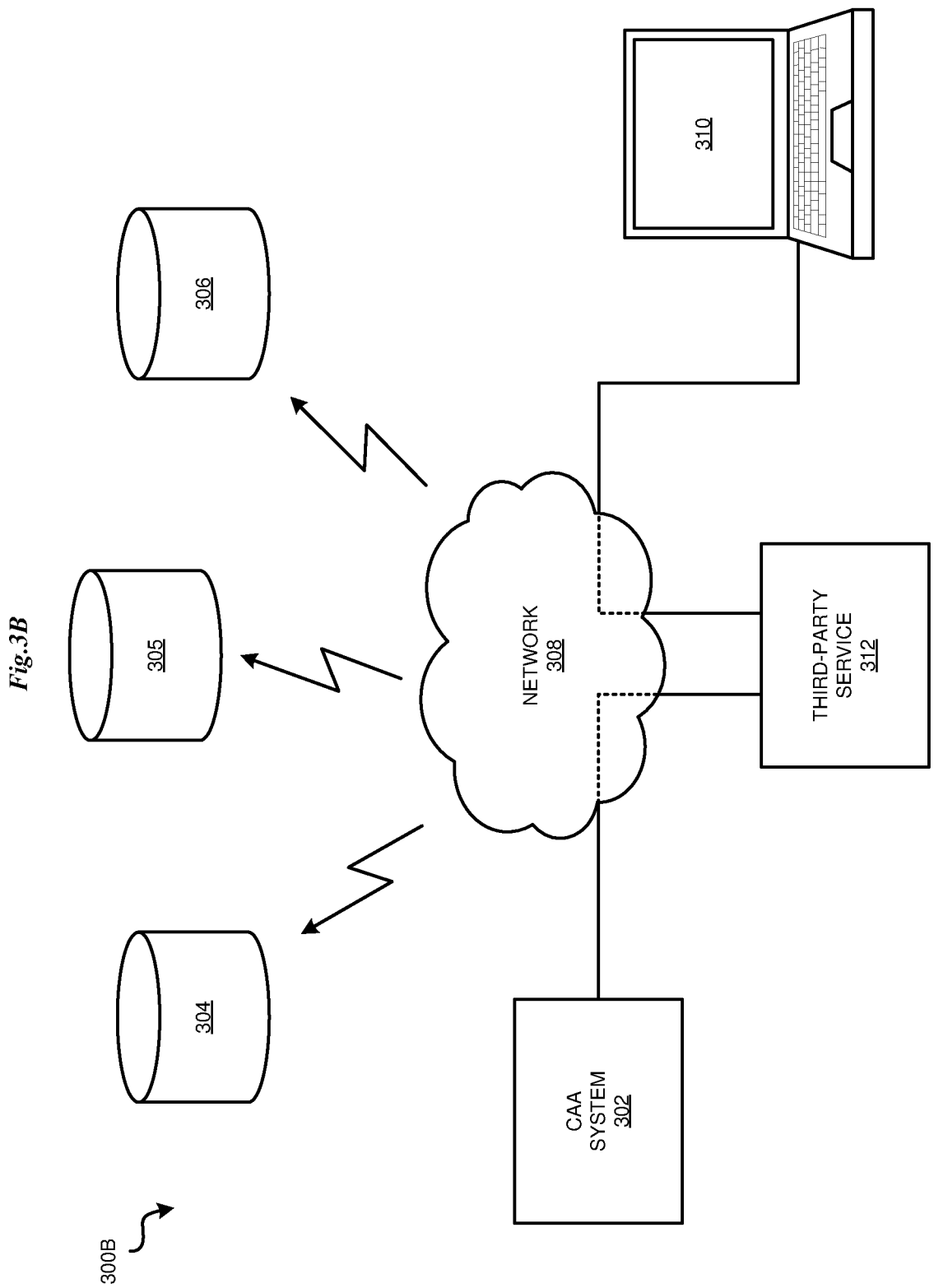
FIG. 3B depicts a block diagram of another example configuration in accordance with an illustrative embodiment.

With reference to FIG. 3A and FIG. 3B, these figures depict block diagrams of example configurations 300A and 300B in accordance with illustrative embodiments. The example embodiments each include a Cognitive Aggregation and Authoring (CAA) system 302. In some embodiments, CAA system 302 is an example of application 105A/105B of FIG. 1.

In the illustrated embodiments, a user device 310, such as a personal computer, is used to send requests for information. For example, the user device 310 may request to receive news articles and/or other forms of digital content related to current headlines or to a particular topic, such as a topic related to an event that the user is attending or another topic of interest to the user. The user device 310 issues the request to the CAA system 302 through a network 308. As discussed in greater detail below, the CAA system 302 receives information from multiple data sources, for example databases 304-306 or other sources of information available via the Internet. The CAA system 302 uses this information to generate machine-authored content. In some embodiments, the CAA system 302 generates content for a particular topic by identifying pieces of the information related to the topic and organizing the pieces of topic-related information into groups. In some embodiments, the CAA system 302 optimizes the groups using a multiple knapsack algorithm to maximize the relatedness of grouped pieces of information and other quality metrics as desired. The CAA system 302 then selects a group and uses the information in that group to generate machine-authored content.

In some embodiments, such as configuration 300A shown in FIG. 3A, the user device 310 issues the request for information directly to a service on the CAA system 302 through the network 308. In alternative embodiments, such as configuration 300B shown in FIG. 3B, the user device 310 issues the request indirectly to the CAA system 302. For example, in the illustrated embodiment for configuration 300B, the user device 310 issues the request to a third-party service 312, which in turn interacts with the CAA system 302. In some such embodiments, the third-party service 312 operates a news website or mobile application, such as an online newspaper, digital magazine, or news aggregator, for which the third-party service 312 receives content from the CAA system 302.

Figure 4:
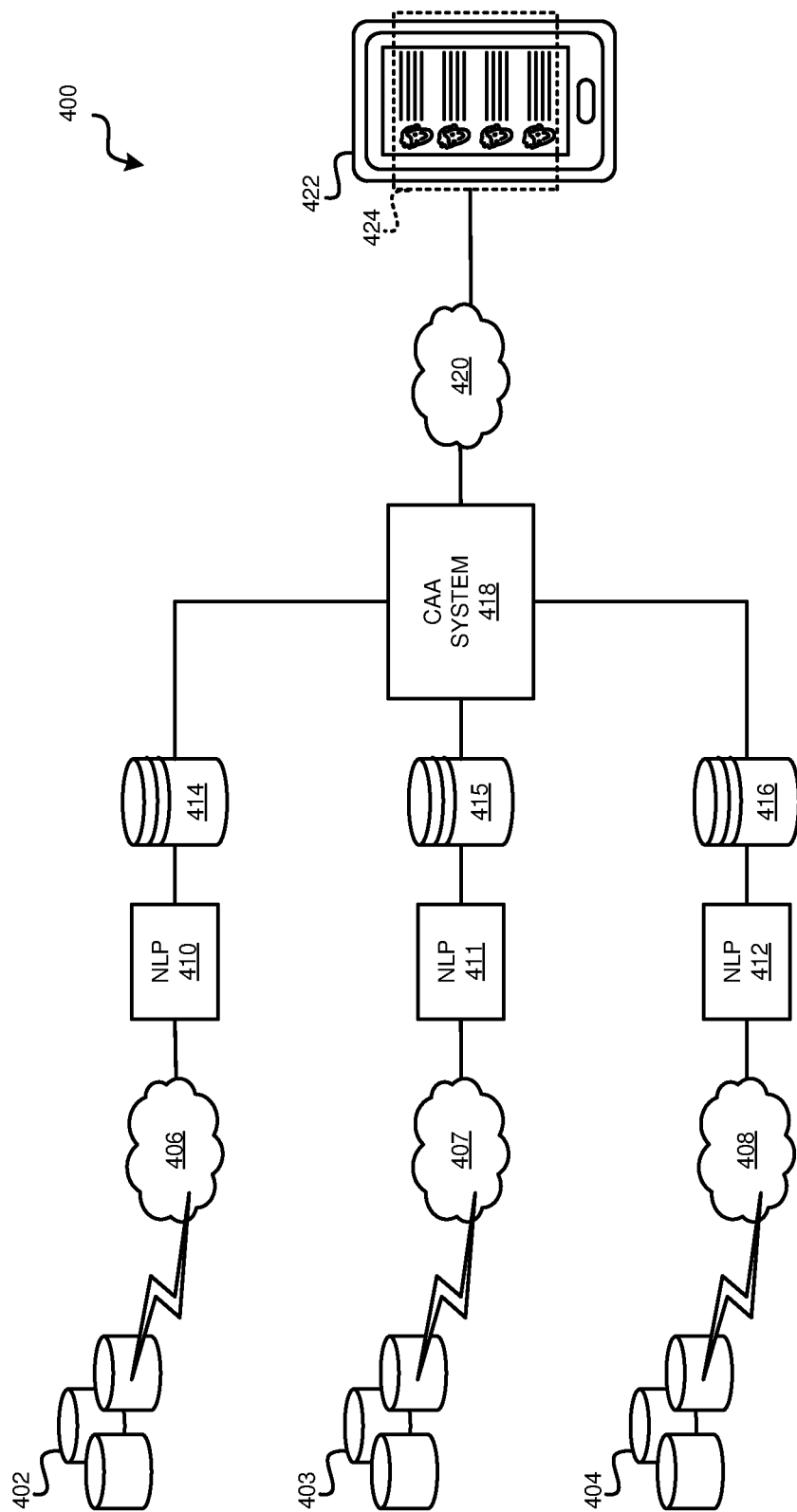
FIG. 4 depicts a block diagram of another example configuration in accordance with an illustrative embodiment

With reference to FIG. 4, this figure depicts a block diagram of an example configuration 400 in accordance with an illustrative embodiment. The example embodiment includes a CAA system 418. In some embodiments, CAA system 418 is an example of CAA system 302 of FIGS. 3A and 3B and of application 105A/105B of FIG. 1.

In the illustrated embodiment, a user device 422, such as a smart phone, tablet computer, or other computing device, runs an application 424 that sends requests for information.

For example, the user device 422 requests to receive news articles and/or other forms of digital content related to current headlines or to a particular topic, such as a topic related to an event that the user is attending or another topic of interest to the user. The user device 422 issues the request (directly or indirectly) to the CAA system 418 through a network 420. As discussed in greater detail below, the CAA system 418 receives information from multiple data sources, for example corpora 414-416 or other sources of information available via the Internet. The CAA system 418 uses this information to generate machine-authored content. In some embodiments, the CAA system 418 generates content for a particular topic by identifying pieces of the information related to the topic and organizing the pieces of topic-related information into groups. In some embodiments, the CAA system 418 optimizes the groups using a multiple knapsack algorithm to maximize the relatedness of grouped pieces of information and other quality metrics as desired. The CAA system 418 then selects a group and uses the information in that group to generate machine-authored content.

In some embodiments, such as configuration 400 shown in FIG. 4, the corpora 414-416 are generated by respective independent NLP pipelines 410-412. NLP pipeline 410 builds the corpus 414 using data from data sources 402 that the NLP pipeline 410 accesses via a network 406. NLP pipeline 411 builds the corpus 415 using data from data sources 403 that the NLP pipeline 411 accesses via a network 407. NLP pipeline 412 builds the corpus 416 using data from data sources 404 that the NLP pipeline 412 accesses via a network 408.

While three NLP pipelines 410-412 are shown, alternative embodiments may include any number of NLP pipelines. Examples of NLP pipelines that may serve as information sources for the CAA system 418 include text analysis systems that may involve information retrieval, lexical analysis to study word frequency distributions, pattern recognition, tagging/annotation, information extraction, data mining techniques including link and association analysis, visualization, and predictive analytics.

In some embodiments, one or more of the NLP pipelines 410-412 include processing for generating insights using textual content generated from structured data. For example, in some embodiments, the NLP processing includes data mining large amounts of data sources, for example by querying tens of thousands or hundreds of thousands of data sources for information related to a certain topic and getting several gigabytes of data in the query results. In some such embodiments, the NLP processing further includes the use of Natural Language Generation, transformer models and decision optimization, to generate insightful summaries, for example summaries that explain a cause and effect within a particular context or scenario, including identifying relationships and behaviors that are responsible or help understanding of the cause and effect.

In some embodiments, one or more of the NLP pipelines 410-412 include processing for generating factoids as textual content from approved data sources. A "factoid," as used herein, refers to a little-known (i.e., trivial), but interesting, piece of information. In some such embodiments, the NLP processing includes data mining large amounts of data sources, for example by querying tens of thousands or hundreds of thousands of data sources for information related to a certain topic and getting several gigabytes of data in the query results. The processing then includes applying extractive summarization to articles within the query results to find sentences that summarize articles or portions of articles. In some embodiments, one or more quality metrics are used to rank the results, for example based on how closely related a result is to the certain topic of interest, the quality of writing (e.g., whether a result includes grammatical errors, spelling errors, or vulgar language), or other desired criteria.

Figure 5:
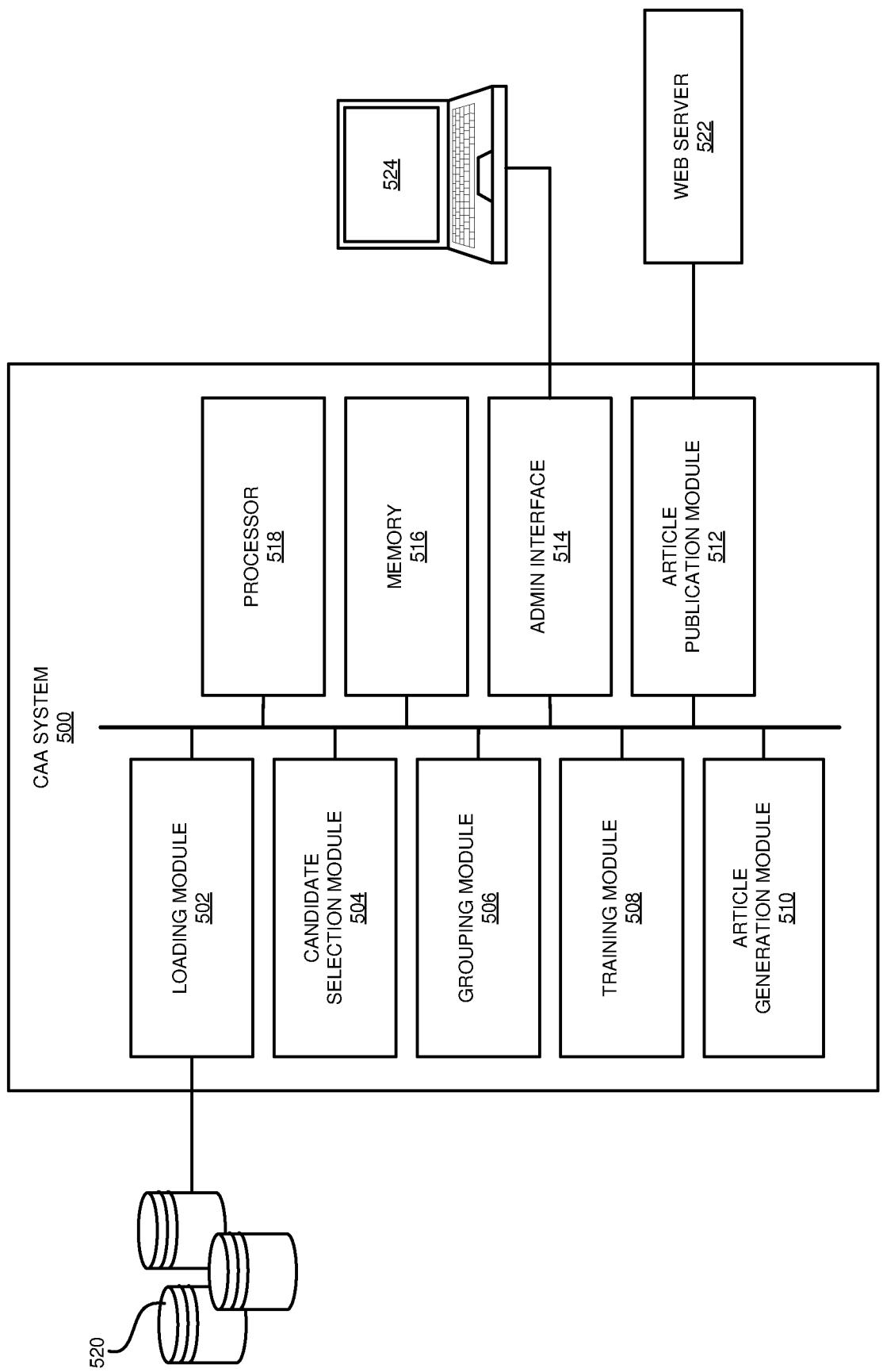
FIG. 5 depicts a block diagram of an example CAA system in accordance with an illustrative embodiment.

With reference to FIG. 5, this figure depicts a block diagram of an example CAA system 500 in accordance with an illustrative embodiment. In a particular embodiment, CAA system is an example of application 105A/105B of FIG. 1, CAA system 302 of FIGS. 3A and 3B, and CAA system 418 of FIG. 4.

In some embodiments, the CAA system 500 includes a loading module 502, a candidate selection module 504, a grouping module 506, a training module 508, an article generation module 510, an article publication module 512, an administration interface 514, memory 516, and a processor 518. In alternative embodiments, the CAA system 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications. In some embodiments, the modules 502-512 and administration interface 514 are software modules that include program instructions executable by the processor 518 to cause the processor 518 to perform the operations described herein.

In the illustrated embodiment, the loading module 502 loads, as part of extracting content from one or more corpora 520, a plurality of digital content datasets into memory 516. The plurality of digital content datasets satisfy a query statement comprising a content topic to which the plurality of digital content datasets are related.

The candidate selection module 504 identifies, from among the plurality of digital content datasets, one or more sets of candidate textual items based on relevance of each candidate textual item to one or more respective subtopics using a computed relevance score for each candidate textual item. In some embodiments, an item is a sentence or phrase. In some embodiments, the candidate selection module 504 computes the relevance are determined by analyzing, utilizing one or more natural language processing techniques, textual content of respective candidate textual items. In some embodiments, the candidate selection module 504 generates feature vectors for each of the candidate textual items based on the analysis of the candidate textual items. In some embodiments, the feature vectors each include one or more relevance values and optionally one or more quality values. In some embodiments, the set of candidate textual items comprises a factoid from a first information source and a statistic from a second information source. In some embodiments, the set of candidate textual items comprises a first candidate textual item and a second candidate textual item written in respective different styles of writing.

The grouping module 506 groups, using the computed relevance scores and feature vectors, candidate textual items from the set of candidate textual items into a predetermined number of groups of candidate textual items. In some embodiments, the grouping module 506 groups the candidate textual items by determining a solution to an MKP resulting in the predetermined number of groups of candidate textual items.

The training module 508 trains a pre-trained encoder-decoder model using, from among the groups of candidate textual items, a designated group of candidate textual items.

The pre-trained encoder-decoder model is pretrained to generate textual content according to a particular style of writing. The article generation module 510 generates, utilizing the pre-trained encoder-decoder model, machine-authored textual content in the particular style of writing resulting in an article about the specified subtopic based on the designated group of candidate textual items.

In some embodiments, the training module 508 trains a plurality of pre-trained encoder-decoder modeled using, from among the groups of candidate textual items, respective ones of a plurality of designated groups of candidate textual items. The plurality of pre-trained encoder-decoder models are pretrained to generate textual content according to respective styles of writing that may differ from one to the next. The article generation module 510 generates, utilizing the plurality of pre-trained encoder-decoder models, machine-authored textual content in the respective styles of writing resulting in a plurality of articles about the specified subtopic(s) based on the designated groups of candidate textual items.

The article publication module 512 transmits the article(s) to a remote web server 522 as updates for a website hosted by the remote web server 522. In some such embodiments, the article publication module 512 transmits the article(s) to the remote web server 522 as updates for a custom webpage, wherein the custom webpage is customized for a user. In some such embodiments, the memory 516 stores user-generated content generated by the user that is indicative of a sentiment of the user towards the topic or subtopics. In some embodiments, the user operates computing device 524 to input via a user administrative interface 514 to input at least a portion of the user-generated content, for example by answering survey questions, filling out a user profile, or other process. In some such embodiments, the candidate selection module 504 generates a weight vector based on the sentiment of the user towards the topic or subtopics, and the grouping module 506 groups\the candidate textual items into groups of candidate textual items using the weight vector to adjust values of the feature vectors.

Figure 6:
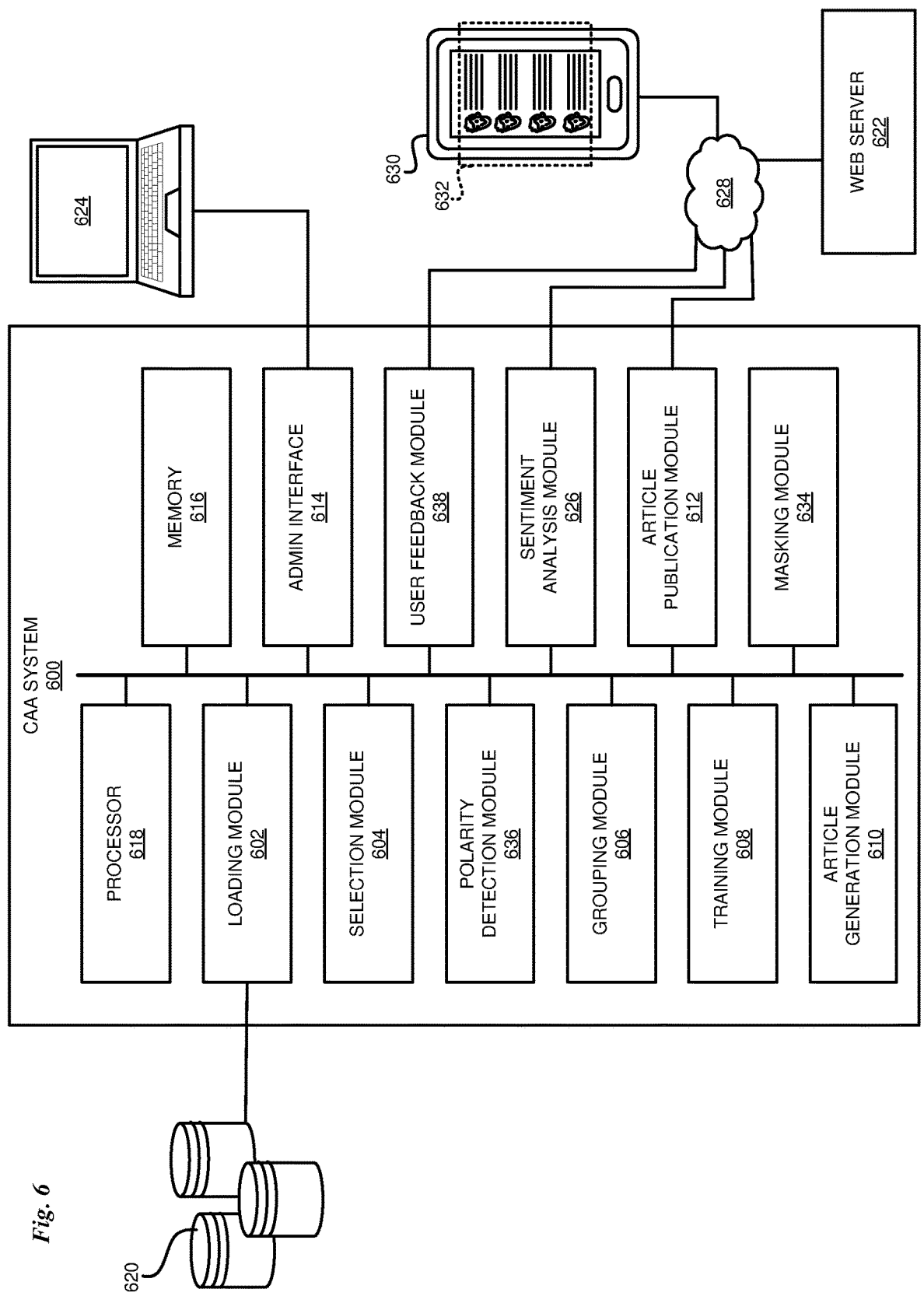
FIG. 6 depicts a block diagram of an example CAA system in accordance with an illustrative embodiment.

With reference to FIG. 6, this figure depicts a block diagram of an example CAA system 600 in accordance with an illustrative embodiment. In a particular embodiment, CAA system is an example of application 105A/105B of FIG. 1, CAA system 302 of FIGS. 3A and 3B, and CAA system 418 of FIG. 4.

In some embodiments, the CAA system 600 includes a loading module 602, a candidate selection module 604, a grouping module 606, a training module 608, an article generation module 610, an article publication module 612, an administration interface 614, memory 616, and a processor 618, a sentiment analysis module 626, a masking module 634, a polarity detection module 636, and a user feedback module 638. In alternative embodiments, the CAA system 600 can include some or all of the functionality described herein but grouped differently into one or more modules. In some embodiments, the functionality described herein is distributed among a plurality of systems, which can include combinations of software and/or hardware-based systems, for example ASICs, computer programs, or smart phone applications. In some embodiments, the modules 602-612, 626, and 634-638, as well as administration interface 614 are software modules that include program instructions executable by the processor 618 to cause the processor 618 to perform the operations described herein.

In the illustrated embodiment, the loading module 602 loads, as part of extracting content from one or more corpora 620, a plurality of digital content datasets into memory 616. The plurality of digital content datasets satisfy a query statement comprising a content topic to which the plurality of digital content datasets are related.

The candidate selection module 604 identifies, from among the plurality of digital content datasets, one or more sets of candidate textual items based on relevance of each candidate textual item to one or more respective subtopics using a computed relevance score for each candidate textual item. In some embodiments, an item is a sentence or phrase. In some embodiments, the candidate selection module 604 computes the relevance are determined by analyzing, utilizing one or more natural language processing techniques, textual content of respective candidate textual items. In some embodiments, the candidate selection module 604 generates feature vectors for each of the candidate textual items based on the analysis of the candidate textual items. In some embodiments, the polarity detection module 636 uses NLP to determine a polarity of each of the candidate textual items and given a polarity score indicative of the degree to which an article is opinionated and may also include an indication of a side of an issue that the article supports. In some embodiments, the feature vectors each include one or more relevance values and optionally one or more quality values and the polarity score. In some embodiments, the set of candidate textual items comprises a factoid from a first information source and a statistic from a second information source. In some embodiments, the set of candidate textual items comprises a first candidate textual item and a second candidate textual item written in respective different styles of writing.

The user feedback module 638 loads into memory 616 user-generated content generated by the user. The sentiment analysis module 626 analyzes, as a part of determining a sentiment of the user towards the subtopic, the user-generated content resulting in determining a polarity of the user-generated content. The masking module 634 generates a weight vector based on the sentiment of the user towards the subtopic.

The grouping module 606 groups, using the computed relevance scores, weight vector, and feature vectors, candidate textual items from the set of candidate textual items into a predetermined number of groups of candidate textual items. In some embodiments, the grouping module 606 groups the candidate textual items by determining a solution to an MKP resulting in the predetermined number of groups of candidate textual items.

The training module 608 trains a pre-trained encoder-decoder model using, from among the groups of candidate textual items, a designated group of candidate textual items. The pre-trained encoder-decoder model is pretrained to generate textual content according to a particular style of writing. The article generation module 610 generates, utilizing the pre-trained encoder-decoder model, machine-authored textual content in the particular style of writing resulting in an article about the specified subtopic based on the designated group of candidate textual items.

In some embodiments, the training module 608 trains a plurality of pre-trained encoder-decoder modeled using, from among the groups of candidate textual items, respective ones of a plurality of designated groups of candidate textual items. The plurality of pre-trained encoder-decoder models are pretrained to generate textual content according to respective styles of writing that may differ from one to the next. The article generation module 610 generates, utilizing the plurality of pre-trained encoder-decoder models, machine-authored textual content in the respective styles of writing resulting in a plurality of articles about the specified subtopic(s) based on the designated groups of candidate textual items.

The article publication module 612 transmits the article(s) to a remote web server 622 via a network 628, which may include the Internet, as updated articles 632 for an application operating on a computing device 630, such as a smart phone or tablet. web site hosted by the remote web server 622. In some such embodiments, the article publication module 612 transmits the article(s) to the remote web server 622 as updates for a custom webpage, wherein the custom webpage is customized for a user. In some such embodiments, the memory 616 stores user-generated content generated by the user that is indicative of a sentiment of the user towards the topic or subtopics. In some embodiments, the user operates computing device 624 to input via a user administrative interface 614 to input at least a portion of the user-generated content, for example by answering survey questions, filling out a user profile, or other process. In some such embodiments, the candidate selection module 604 generates a weight vector based on the sentiment of the user towards the topic or subtopics, and the grouping module 606 groups\the candidate textual items into groups of candidate textual items using the weight vector to adjust values of the feature vectors.

Figure 7:
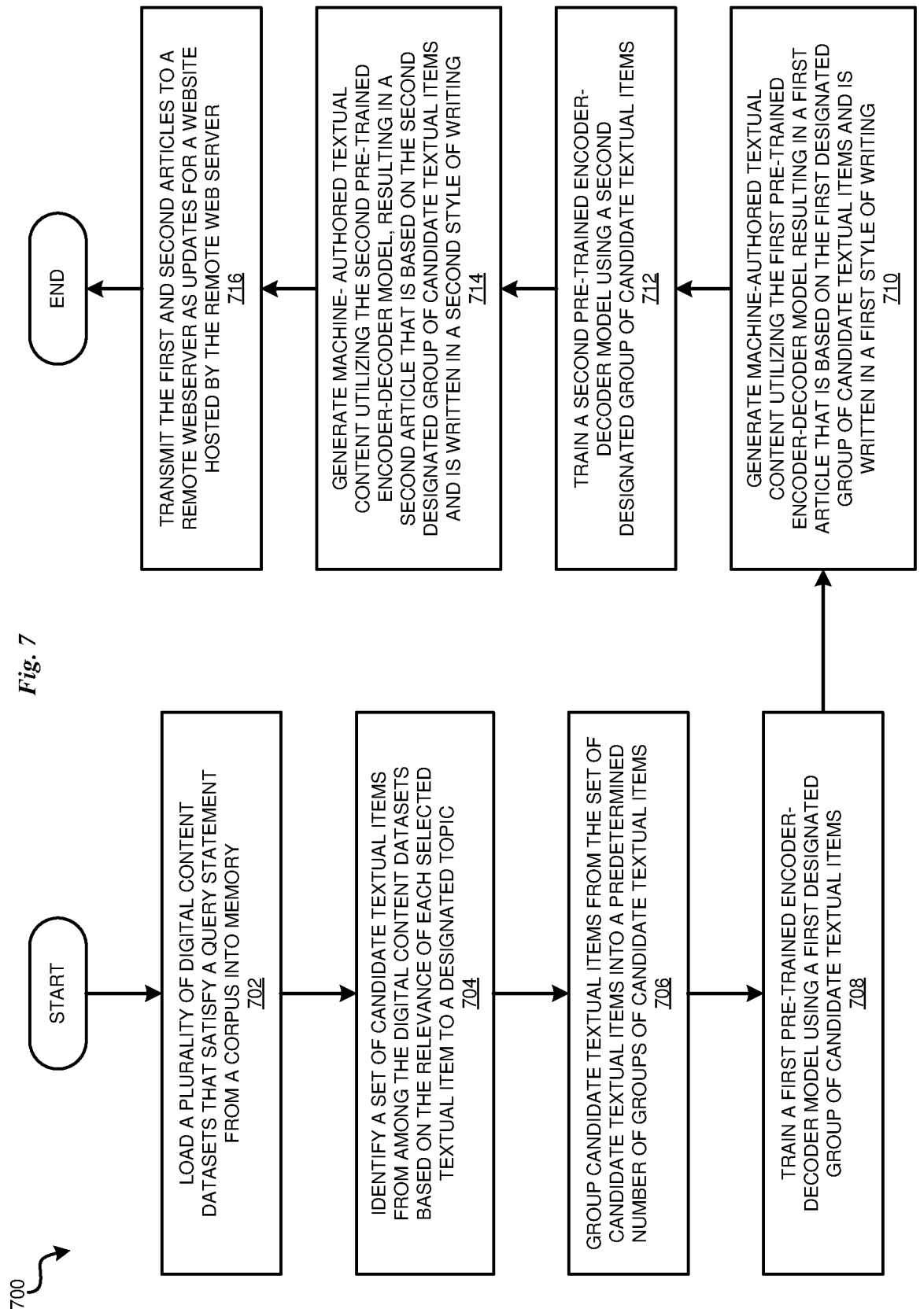
FIG. 7 depicts a flowchart of an example process for cognitive aggregation and authoring in accordance with an illustrative embodiment.

With reference to FIG. 7, this figure depicts a flowchart of an example process 700 for cognitive aggregation and authoring in accordance with an illustrative embodiment. In some embodiments, the CAA system 302, CAA system 418, CAA system 500, or CAA system 600 carries out the process 700.

In an embodiment, at block 702, the process loads, as part of extracting content from a corpus, a plurality of digital content datasets into memory. The plurality of digital content datasets satisfy a query statement comprising a content topic to which the plurality of digital content datasets are related.

Next, at block 704, the process identifies, from among the plurality of digital content datasets, a set of candidate textual items based on relevance of each candidate textual item to a subtopic using a computed relevance score for each candidate textual item. In some embodiments, an item is a sentence or phrase. In some embodiments, the computed relevance scores are determined by analyzing, utilizing one or more natural language processing techniques, textual content of respective candidate textual items. In some embodiments, the analyzing of the textual content of the candidate textual items results in respective feature vectors for each of the candidate textual items. In some embodiments, the feature vectors each include a respective relevance value and a respective quality value. In some embodiments, the set of candidate textual items comprises a factoid from a first information source and a statistic from a second information source. In some embodiments, the set of candidate textual items comprises a first candidate textual item and a second candidate textual item written in respective different styles of writing.

Next, at block 706, the process groups, as a result of executing a set of instructions in a processor, using the computed relevance scores and feature vectors, candidate textual items from the set of candidate textual items into a predetermined number of groups of candidate textual items. In some embodiments, the grouping of the candidate textual items comprises determining a solution to a MKP resulting in the predetermined number of groups of candidate textual items. Next, at block 708, the process trains a first pre-trained encoder-decoder model using, from among the groups of candidate textual items, a first designated group of candidate textual items. The first pre-trained encoder-decoder model is pretrained to generate textual content according to a first style of writing. Next, at block 710, the process generates, utilizing the first pre-trained encoder-decoder model, machine-authored textual content in the first style of writing resulting in a first article about the specified subtopic based on the first designated group of candidate textual items. Next, at block 712, the process trains a second pre-trained encoder-decoder model using, from among the groups of candidate textual items, a second designated group of candidate textual items. The second pre-trained encoder-decoder model is pretrained to generate textual content according to a second style of writing. Next, at block 714, the process generates, utilizing the second pre-trained encoder-decoder model, machine-authored textual content in the second style of writing resulting in a second article about the specified subtopic based on the second designated group of candidate textual items.

Next, at block 716, the process transmits the first and second articles to a remote web server as updates for a web site hosted by the remote web server. In some such embodiments, the transmitting the first and second articles to the remote web server as updates for the web site comprises transmitting the first and second articles as updates for a custom webpage, wherein the custom webpage is customized for a user. In some such embodiments, the process includes loading into memory user-generated content generated by the user, analyzing, as a part of determining a sentiment of the user towards the topic, the selected user-generated content resulting in determining a polarity of the selected user-generated content, and identifying, from the user-generated content, selected user-generated content based on relevance of the selected user-generated content to the topic. In some such embodiments, the process includes generating a weight vector based on the sentiment of the user towards the topic, where the grouping of the candidate textual items into groups of candidate textual items further comprises using the weight vector to adjust values of the feature vectors.

Figure 8:
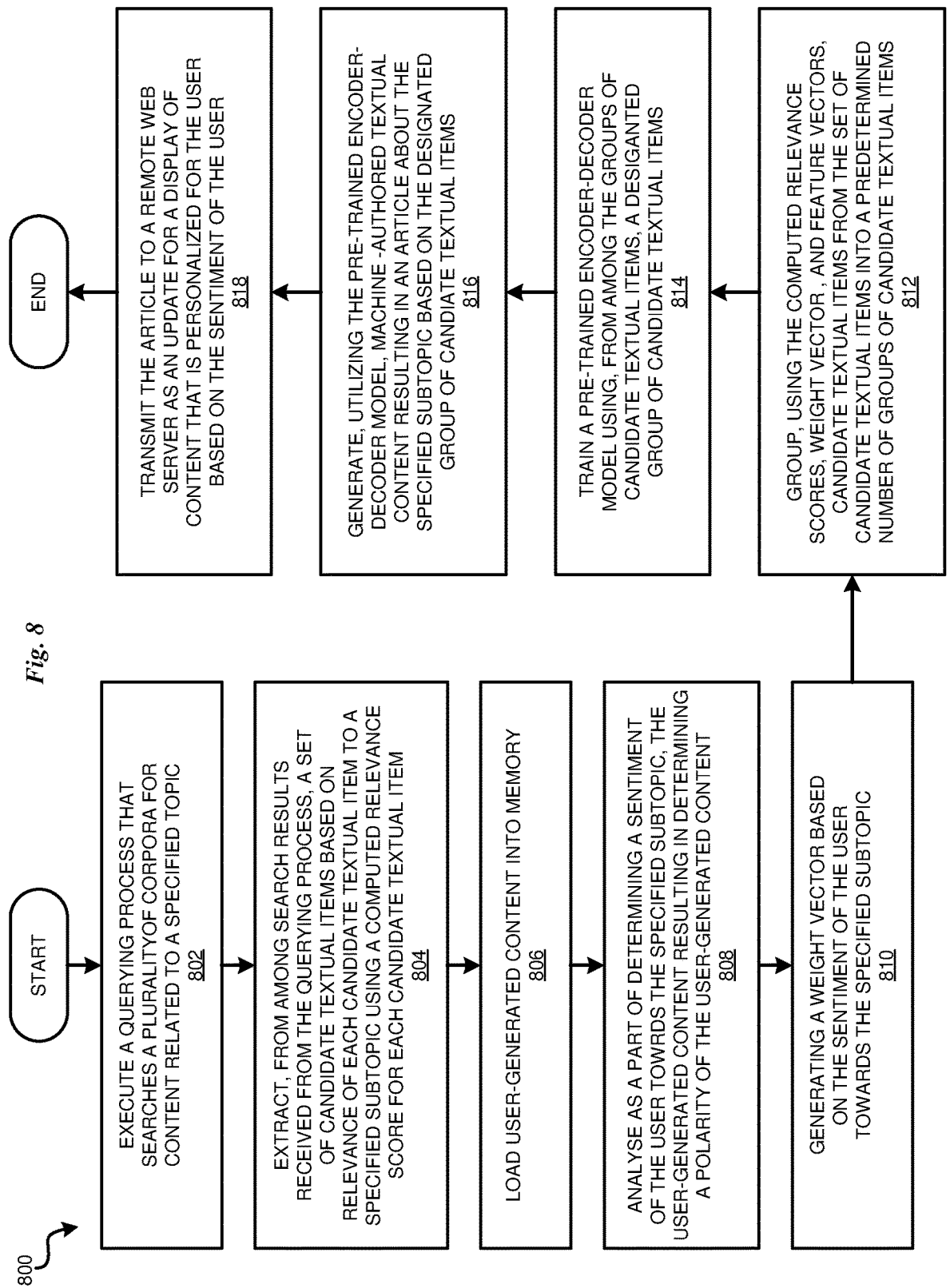
FIG. 8 depicts a flowchart of an example process for cognitive aggregation and authoring in accordance with an illustrative embodiment.

With reference to FIG. 8, this figure depicts a flowchart of an example process 800 for cognitive aggregation and authoring in accordance with an illustrative embodiment. In some embodiments, the CAA system 302, CAA system 418, CAA system 500, or CAA system 600 carries out the process 800.

In an embodiment, at block 802, the process executes a querying process that searches a plurality of corpora for content related to a specified topic.

Next, at block 804, the process extracts, from among search results received from the querying process, a set of candidate textual items based on the relevance of each candidate textual item to a specified subtopic using a computed relevance score for each candidate textual item. The computed relevance scores are determined by analyzing the textual content of the candidate textual items using one or more natural language processing techniques. The analyzing of the textual content of the candidate textual items results in respective feature vectors for each of the candidate textual items. The feature vectors each include a respective relevance value and a respective quality value.

Next, at block 806, the process loads user-generated content into memory. For example, in some embodiments, the process sends a feedback request to the user that includes a request for feedback regarding an opinion expressed in an editorial article related to the subtopic. The user may be invited to comment on the opinion or simply indicate whether they agree or disagree with the opinion. The user-generated content would thus include the feedback received from the user in response to the feedback request. In some embodiments, the user-generated content may include one or more comments that the user posted in response to a post or article related to the subtopic, for example on a news website or social media website. In such embodiments, the user would have previously provided a list of such websites in which they actively participate and also would have indicated that they agree to opt-in to allowing the process to access these comments previously posted by the user.

Next, at block 808, the process analyzes the user-generated content in order to determine a polarity of the user-generated content, which the process uses to determine the user's sentiment towards the specified subtopic.

Next, at block 810, the process generates a weight vector based on the sentiment of the user towards the specified subtopic. Next, at block 812, the process groups the candidate textual items into a predetermined number of groups based on the computed relevance scores, the weight vector, and the feature vectors.

Next, at block 814, the process trains a pre-trained encoder-decoder model using a designated group of candidate textual items from among the groups of candidate textual items. Next, at block 816, the process generates machine-authored textual content utilizing the pre-trained encoder-decoder model, resulting in an article about the specified subtopic based on the designated group of candidate textual items. Next, at block 818, the process transmits the article to a remote web server as an update for a display of content that is personalized for the user based on the sentiment of the user.

Figure 9:
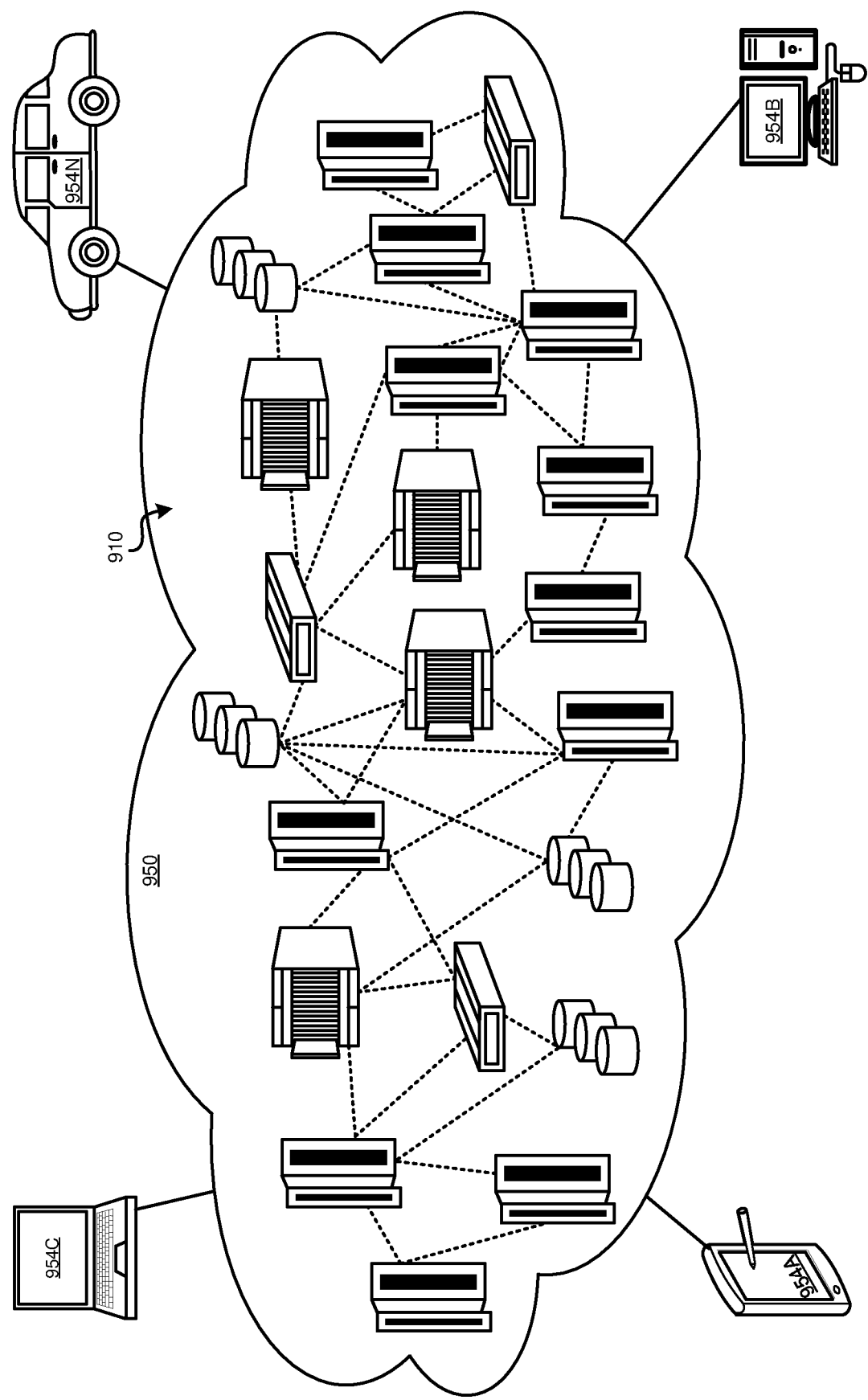
FIG. 9 depicts a cloud computing environment according to an embodiment of the present invention.

With reference to FIG. 9, this figure is illustrative of cloud computing environment 950. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
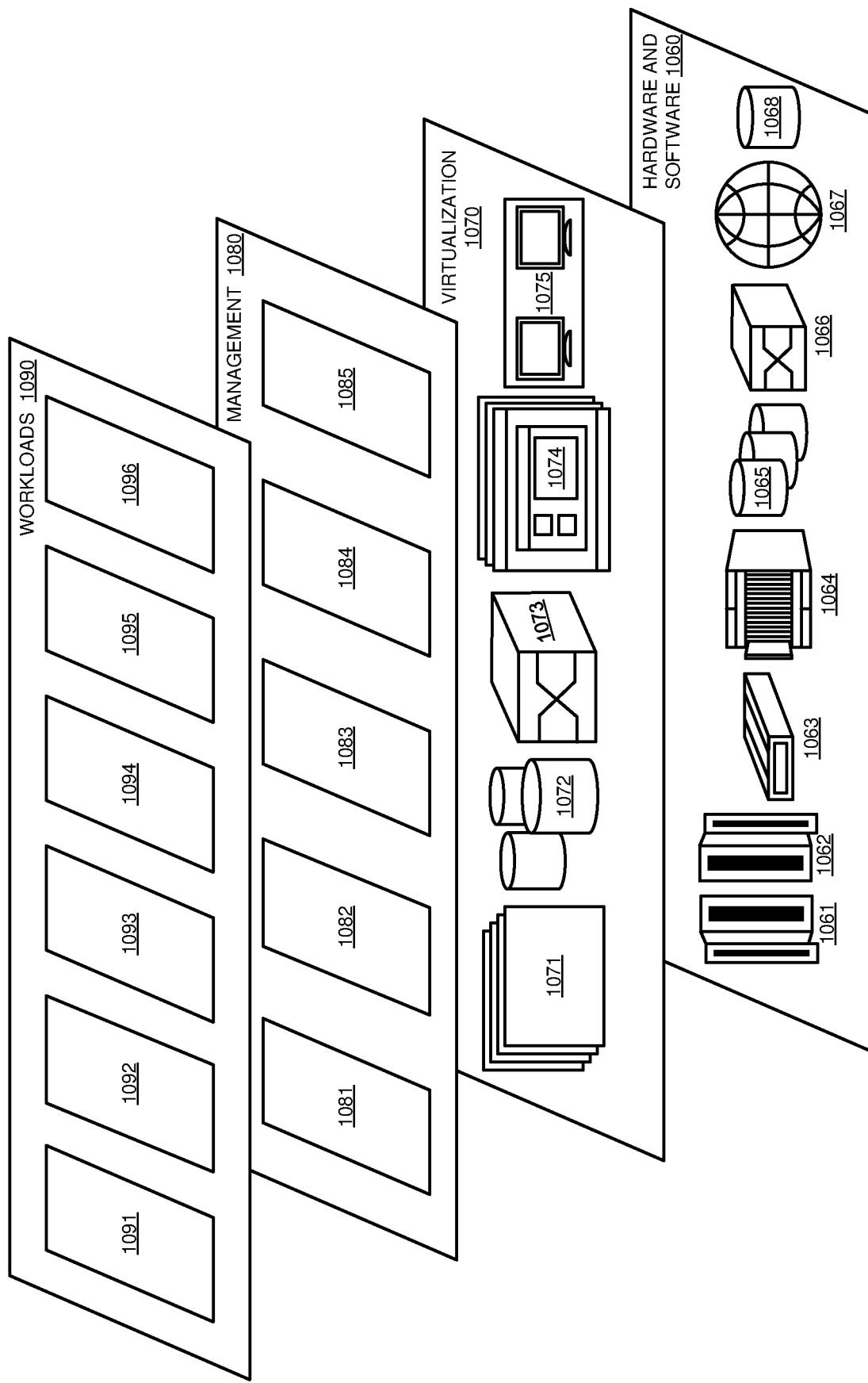
FIG. 10 depicts abstraction model layers according to an embodiment of the present invention.

With reference to FIG. 10, this figure shows a set of functional abstraction layers provided by cloud computing environment 950 (FIG. 9). It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; Reduced Instruction Set Computer (RISC) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workload's layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and demand-drive locale management 1096.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a SaaS model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a Random Access Memory (RAM), a Read-Only Memory (ROM), an Erasable Programmable Read-Only Memory (EPROM or Flash memory), a Static Random Access Memory (SRAM), a portable CD-ROM, a Digital Versatile Disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   loading, as part of extracting content from a corpus, a plurality of digital content datasets into memory, wherein the plurality of digital content datasets satisfy a query statement, the query statement comprising a content topic to which the plurality of digital content datasets are related;
   identifying, from among the plurality of digital content datasets, a set of candidate textual items based on relevance of each candidate textual item to a subtopic using a computed relevance score for each candidate textual item, wherein the computed relevance scores are determined by analyzing, utilizing one or more natural language processing techniques, textual content of respective candidate textual items,
   wherein the analyzing of the textual content of the set of candidate textual items results in respective feature vectors for each of the candidate textual items,
   wherein the feature vectors each include a respective relevance value and a respective quality value;
   grouping, as a result of executing a set of instructions in a processor, using the computed relevance scores and feature vectors, candidate textual items from the set of candidate textual items into a predetermined number of groups of candidate textual items;
   training a first pre-trained encoder-decoder model using, from among the groups of candidate textual items, a first designated group of candidate textual items, wherein the first pre-trained encoder-decoder model is pretrained to generate textual content according to a first style of writing;
   generating, utilizing the first pre-trained encoder-decoder model, machine-authored textual content in the first style of writing resulting in a first article about the subtopic based on the first designated group of candidate textual items;
   training a second pre-trained encoder-decoder model using, from among the groups of candidate textual items, a second designated group of candidate textual items, wherein the second pre-trained encoder-decoder model is pretrained to generate textual content according to a second style of writing;
   generating, utilizing the second pre-trained encoder-decoder model, machine-authored textual content in the second style of writing resulting in a second article about the subtopic based on the second designated group of candidate textual items; and
   transmitting the first and second articles to a remote web server as updates for a website hosted by the remote web server.

2. The computer-implemented method of claim 1, wherein the set of candidate textual items comprises a factoid from a first information source and a statistic from a second information source.

3. The computer-implemented method of claim 1, wherein the set of candidate textual items comprises a first candidate textual item and a second candidate textual item written in respective different styles of writing.

4. The computer-implemented method of claim 1, wherein the grouping of the candidate textual items comprises determining a solution to a multiple knapsack problem resulting in the predetermined number of groups of candidate textual items.

5. The computer-implemented method of claim 1, wherein the transmitting the first and second articles to the remote web server as updates for the website comprises transmitting the first and second articles as updates for a custom webpage, wherein the custom webpage is customized for a user.

6. The computer-implemented method of claim 5, further comprising:
    loading into memory user-generated content generated by the user; and
    identifying, from the user-generated content, selected user-generated content based on relevance of the selected user-generated content to the topic.

7. The computer-implemented method of claim 6, further comprising:
    analyzing, as a part of determining a sentiment of the user towards the topic, the selected user-generated content resulting in determining a polarity of the selected user-generated content.

8. The computer-implemented method of claim 7, further comprising:
    generating a weight vector based on the sentiment of the user towards the topic,
    wherein the grouping of the candidate textual items into groups of candidate textual items further comprises using the weight vector to adjust values of the feature vectors.

9. The computer-implemented method of claim 1, wherein the set of candidate textual items includes sentences.

10. A computer program product comprising one or more computer readable storage media, and program instructions collectively stored on the one or more computer readable storage media, the program instructions executable by a processor to cause the processor to perform operations comprising:
    loading, as part of extracting content from a corpus, a plurality of digital content datasets into memory, wherein the plurality of digital content datasets satisfy a query statement, the query statement comprising a content topic to which the plurality of digital content datasets are related;
    identifying, from among the plurality of digital content datasets, a set of candidate textual items based on relevance of each candidate textual item to a subtopic using a computed relevance score for each candidate textual item, wherein the computed relevance scores are determined by analyzing, utilizing one or more natural language processing techniques, textual content of respective candidate textual items,
    wherein the analyzing of the textual content of the candidate textual items results in respective feature vectors for each of the candidate textual items,
    wherein the feature vectors each include a respective relevance value and a respective quality value;
    grouping, as a result of executing a set of instructions in a processor, using the computed relevance scores and feature vectors, candidate textual items from the set of candidate textual items into a predetermined number of groups of candidate textual items;
    training a first pre-trained encoder-decoder model using, from among the groups of candidate textual items, a first designated group of candidate textual items, wherein the first pre-trained encoder-decoder model is pretrained to generate textual content according to a first style of writing;
    generating, utilizing the first pre-trained encoder-decoder model, machine-authored textual content in the first style of writing resulting in a first article about the subtopic based on the first designated group of candidate textual items;
    training a second pre-trained encoder-decoder model using, from among the groups of candidate textual items, a second designated group of candidate textual items, wherein the second pre-trained encoder-decoder model is pretrained to generate textual content according to a second style of writing;
    generating, utilizing the second pre-trained encoder-decoder model, machine-authored textual content in the second style of writing resulting in a second article about the subtopic based on the second designated group of candidate textual items; and
    transmitting the first and second articles to a remote web server as updates for a website hosted by the remote web server.

11. The computer program product of claim 10, wherein the stored program instructions are stored in a computer readable storage device in a data processing system, and wherein the stored program instructions are transferred over a network from a remote data processing system.

12. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
    program instructions to meter use of the program instructions associated with the request; and
    program instructions to generate an invoice based on the metered use.

13. The computer program product of claim 10, wherein the set of candidate textual items comprises a factoid from a first information source and a statistic from a second information source.

14. The computer program product of claim 10, wherein the set of candidate textual items comprises a first candidate textual item and a second candidate textual item written in respective different styles of writing.

15. The computer program product of claim 10, wherein the grouping of the candidate textual items comprises determining a solution to a multiple knapsack problem resulting in the predetermined number of groups of candidate textual items.

16. The computer program product of claim 10, wherein the transmitting the first and second articles to the remote web server as updates for the web site comprises transmitting the first and second articles as updates for a custom webpage, wherein the custom webpage is customized for a user.

17. A computer system comprising a processor and one or more computer readable storage media, and program instructions collectively stored on the one or more computer readable storage media, the program instructions executable by the processor to cause the processor to perform operations comprising:
    loading, as part of extracting content from a corpus, a plurality of digital content datasets into memory, wherein the plurality of digital content datasets satisfy a query statement, the query statement comprising a content topic to which the plurality of digital content datasets are related;

identifying, from among the plurality of digital content datasets, a set of candidate textual items based on relevance of each candidate textual item to a subtopic using a computed relevance score for each candidate textual item, wherein the computed relevance scores are determined by analyzing, utilizing one or more natural language processing techniques, textual content of respective candidate textual items, wherein the analyzing of the textual content of the candidate textual items results in respective feature vectors for each of the candidate textual items, wherein the feature vectors each include a respective relevance value and a respective quality value;

grouping, as a result of executing a set of instructions in a processor, using the computed relevance scores and feature vectors, candidate textual items from the set of candidate textual items into a predetermined number of groups of candidate textual items;

training a first pre-trained encoder-decoder model using, from among the groups of candidate textual items, a first designated group of candidate textual items, wherein the first pre-trained encoder-decoder model is pretrained to generate textual content according to a first style of writing;

generating, utilizing the first pre-trained encoder-decoder model, machine-authored textual content in the first style of writing resulting in a first article about the subtopic based on the first designated group of candidate textual items;

training a second pre-trained encoder-decoder model using, from among the groups of candidate textual items, a second designated group of candidate textual items, wherein the second pre-trained encoder-decoder model is pretrained to generate textual content according to a second style of writing;

generating, utilizing the second pre-trained encoder-decoder model, machine-authored textual content in the second style of writing resulting in a second article about the subtopic based on the second designated group of candidate textual items; and transmitting the first and second articles to a remote web server as updates for a website hosted by the remote web server.

18. The computer system of claim 17, wherein the set of candidate textual items comprises a factoid from a first information source and a statistic from a second information source.

19. The computer system of claim 17, wherein the set of candidate textual items comprises a first candidate textual item and a second candidate textual item written in respective different styles of writing.

20. The computer system of claim 17, wherein the grouping of the candidate textual items comprises determining a solution to a multiple knapsack problem resulting in the predetermined number of groups of candidate textual items.

21. A computer-implemented method comprising:

executing a querying process that searches a plurality of corpora for content related to a specified topic;

extracting, from among search results received from the querying process, a set of candidate textual items based on relevance of each candidate textual item to a subtopic using a computed relevance score for each candidate textual item, wherein the computed relevance scores are determined by analyzing, utilizing one or more natural language processing techniques, textual content of respective candidate textual items, wherein the analyzing of the textual content of the candidate textual items results in respective feature vectors for each of the candidate textual items, wherein the feature vectors each include a respective relevance value and a respective quality value;

loading into memory user-generated content generated by the user;

analyzing, as a part of determining a sentiment of the user towards the subtopic, the user-generated content resulting in determining a polarity of the user-generated content;

generating a weight vector based on the sentiment of the user towards the subtopic;

grouping, as a result of executing a set of instructions in a processor, using the computed relevance scores, weight vector, and feature vectors, candidate textual items from the set of candidate textual items into a predetermined number of groups of candidate textual items;

training a pre-trained encoder-decoder model using, from among the groups of candidate textual items, a designated group of candidate textual items;

generating, utilizing the pre-trained encoder-decoder model, machine-authored textual content resulting in an article about the subtopic based on the designated group of candidate textual items; and transmitting the article to a remote web server as an update for a display of content that is personalized for the user based on the sentiment of the user.

22. The computer-implemented method of claim 21, further comprising sending a feedback request to the user, wherein the feedback request includes a request for feedback from the user regarding an opinion related to the subtopic, wherein the user-generated content includes feedback received from the user in response to the feedback request.

23. The computer-implemented method of claim 21, wherein the user-generated content includes a comment posted by the user in response to an article related to the subtopic.

24. A computer program product comprising one or more computer readable storage media, and program instructions collectively stored on the one or more computer readable storage media, the program instructions executable by a processor to cause the processor to perform operations comprising:

executing a querying process that searches a plurality of corpora for content related to a specified topic;

extracting, from among search results received from the querying process, a set of candidate textual items based on relevance of each candidate textual item to a subtopic using a computed relevance score for each candidate textual item, wherein the computed relevance scores are determined by analyzing, utilizing one or more natural language processing techniques, textual content of respective candidate textual items, wherein the analyzing of the textual content of the candidate textual items results in respective feature vectors for each of the candidate textual items, wherein the feature vectors each include a respective relevance value and a respective quality value;

loading into memory user-generated content generated by the user;

analyzing, as a part of determining a sentiment of the user towards the subtopic, the user-generated content resulting in determining a polarity of the user-generated content;

generating a weight vector based on the sentiment of the user towards the subtopic;

grouping, as a result of executing a set of instructions in a processor, using the computed relevance scores, weight vector, and feature vectors, candidate textual items from the set of candidate textual items into a predetermined number of groups of candidate textual items;

training a pre-trained encoder-decoder model using, from among the groups of candidate textual items, a designated group of candidate textual items;

generating, utilizing the pre-trained encoder-decoder model, machine-authored textual content resulting in an article about the subtopic based on the designated group of candidate textual items; and transmitting the article to a remote web server as an update for a display of content that is personalized for the user based on the sentiment of the user.

25. The computer program product of claim 24, further comprising program instructions executable by the processor to cause the processor to perform operations comprising:

sending a feedback request to the user, wherein the feedback request includes a request for feedback from the user regarding an opinion related to the subtopic, wherein the user-generated content includes feedback received from the user in response to the feedback request.

\* \* \* \* \*